250/201

United States Patent [19]

Compaan et al.

[11] 3,833,769

[45] Sept. 3, 1974

[54] APPARATUS FOR POSITIONAL CONTROL OF A READING HEAD IN A DEVICE FOR REPRODUCING OPTICALLY CODED VIDEO DISK RECORDINGS

[75] Inventors: Klaas Compaan; Gijsbertus Bouwhuis, both of Emmasingel, Eindhoven, Netherlands

[73] Assignee: U.S. Philips Corporation, New York, N.Y.

[22] Filed: Feb. 25, 1972

[21] Appl. No.: 229,291

[30] Foreign Application Priority Data

Mar. 11, 1971 Netherlands ....................... 7103234

[52] U.S. Cl. 179/100.3 V, 178/DIG. 29, 178/6.7 A, 179/100.3 G, 250/201, 250/237 G

[51] Int. Cl......... G11b 7/12, G11b 7/16, G11b 7/24

[58] Field of Search179/100.3 G, 100.3 V, 100.3 B; 178/6.7 R, 6.7 A, 6.6 DD, DIG. 29; 250/201, 202, 219 Q, 214 QA, 219 FT, 219 D, 219 DD, 214 DR, 237 G; 340/173 LM; 356/169

[56] References Cited

UNITED STATES PATENTS

| | | | |
|---|---|---|---|
| 3,553,455 | 1/1971 | Sato et al. | 250/201 |
| 3,612,695 | 10/1971 | Bouwhuis et al. | 250/237 G |
| 3,673,412 | 6/1972 | Olson | 179/100.3 V |
| 3,743,395 | 7/1973 | Preuss | 178/DIG. 29 |
| 3,756,723 | 9/1973 | Hock | 250/237 G |

*Primary Examiner*—Raymond F. Cardillo, Jr.
*Attorney, Agent, or Firm*—Frank R. Trifari; Simon L. Cohen

[57] ABSTRACT

An apparatus is described for reading, by means of a beam of radiation, a disk-shaped information carrier which contains spirally arranged video and/or audio signals coded in optical form, which apparatus comprises a source of radiation and a radiationsensitive signal detector cell, the information carrier being disposed in the radiation path between this source and this detector cell. By providing at least one grating, consisting of radiation-transmitting and radiation-absorbing stripes and on which an image of part of the grating-shaped structure of the information track in the vicinity of the portion of this track to be read may be formed, and a radiation-sensitive detection system, an accurate indication of axial and radial displacements of the optical imaging system relative to the information carrier can be obtained.

15 Claims, 17 Drawing Figures

Figure 1:
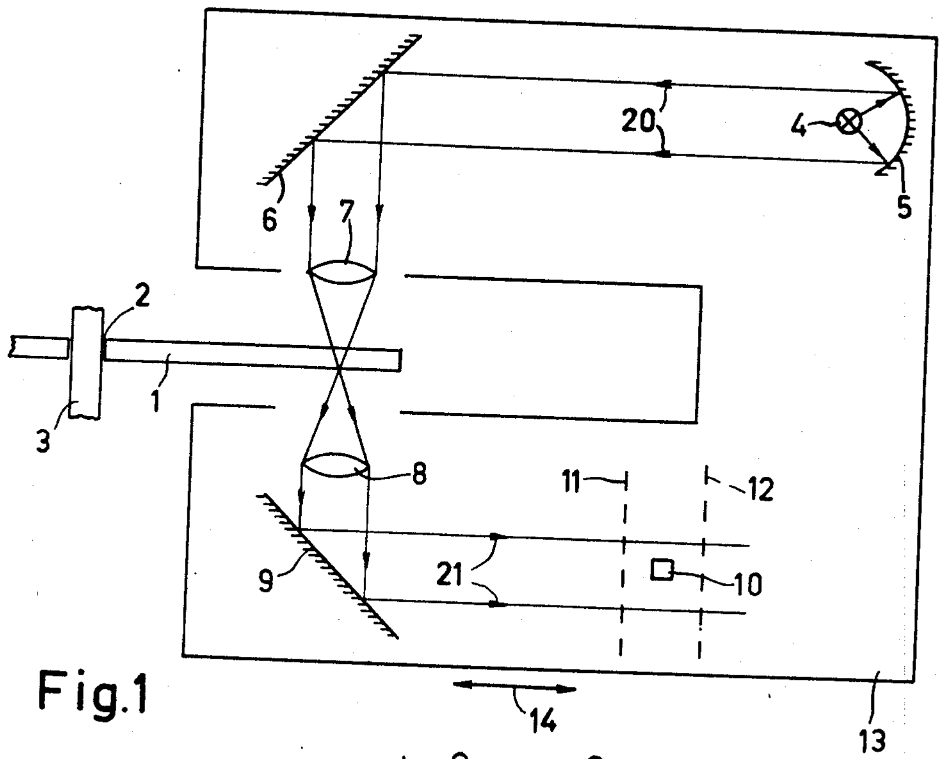

APPARATUS FOR POSITIONAL CONTROL OF A READING HEAD IN A DEVICE FOR REPRODUCING OPTICALLY CODED VIDEO DISK RECORDINGS

The invention relates to an apparatus for reading, by means of a beam of radiation, a disk-shaped information carrier which contains spirally arranged video and/or audio signals coded in optical form, which apparatus comprises a source of radiation and a radiation-sensitive signal detector cell, the information carrier being disposed in the radiation path between this source and this detector cell.

With spirally arranged is meant arranged in the form of quasi-concentric or concentric stripes.

An apparatus of this type is described in U.S. Patent Specification No. 3,381,086. In the known apparatus a beam of radiation is directed through the information carrier and the beam which emerges from the information carrier is focussed by an optical imaging system onto a reflective element which comprises two reflective surfaces disposed at an acute angle. The radiation beam incident on the reflective element is divided into two sub-beams which each are applied to a radiation-sensitive detector cell. The electric output signals of the detector cells are compared with one another and the difference signal is used for positioning the reading beams relative to the information-carrying track (hereinafter for brevity referred to as information track). Both a coarse control and a fine control are achieved by means of the same difference signal. The coarse control means the radial control of a read system accommodated in a casing along the information track. The fine control relates to the alignment of the reflective element relative to the information track.

In the known apparatus the accuracy and insensitivity to interference of the radial control are not satisfactory. Furthermore the known apparatus includes no provisions for following vertical movements of the information carrier relative to the optical imaging system. Moreover any spatial intensity distributions in the radiation emitted by the source are not allowed for.

It is an object of the invention to provide a read apparatus of the type described at the beginning of this specification which gives an accurate indication of axial and radial displacements of the optical imaging system relative to the information carrier, which apparatus is insensitive to spatial variations in the intensity of the radiation used. For this purpose the apparatus according to the invention is characterized in that at least one grating which consists of radiation-transmitting and radiation-absorbing stripes and on which an image of part of the grating-shaped structure of the information track in the vicinity of the portion of this track to be read may be formed and a radiation-sensitive detection system are provided. The electrical output signals of the detection system may be used in known manner for radially displacing the read beam across the information track and/or displacing the plane in which the image of the portion of the information track to be read is produced. In the apparatus according to the invention the fact that the radially adjacent track portions together form a grating which in a small area is substantially linear is utilized. Thus, this apparatus is based on another principle than is the known apparatus and has the advantage that by the use of a large area of the information carrier a greater amount of radiation is available so that a signal with reduced sensitivity to interference is obtained.

In an apparatus according to the invention a grating consisting of radiation-transmitting and radiation-absorbing stripes and the radiation-sensitive detection system are preferably combined to form a grating-shaped radiation-sensitive detector.

An apparatus according to the invention for detecting changes in the position of the plane in which the image of the portion of the information track to be read is produced is characterized in that there are inserted in the path of the radiation at a location behind the information carrier two component gratings consisting of radiation-transmitting and radiation-absorbing stripes, and that the optical path length between either of these gratings and the location of the information carrier are different. The beams transmitted by the gratings are converted into electric signals which are compared with one another. If the image plane is observed as being situated midway between the two component gratings, the signals are equal. If the image plane is observed as shifted towards one of the component gratings, the signals are unequal.

The component gratings preferably are in the form of one grating in front of which radiation-transmitting plates of different thicknesses are arranged.

By arranging a beam splitter in front of each of the component gratings and by inserting a radiation-sensitive detector cell in the radiation path of either sub-beam produced by this beam splitter, according to the invention the apparatus may be rendered insensitive to spatial variations in the intensity of the radiation used.

This may also be obtained by placing a beam splitter in the path of the radiation beam transmitted or reflected by the information carrier and by placing a component grating in the path of either sub-beam produced by the beam splitter, which component gratings are spaced from the beam splitter by different distances. The apparatus can be rendered insensitive to inhomogeneities in the gratings by so arranging the component gratings with respect to one another that the stripes of the two component gratings when projected on to the plane of the information carrier are aligned, so that when reading the information carrier the image of the information grating is successively swept over the component gratings.

A device according to the invention for detecting the radial position of the read beam relative to the information track is characterized in that a grating of radiation-transmitting and radiation-absorbing stripes is positioned in the plane of the signal detector cell.

By composing this grating from two component gratings the grating stripes of which are mutually shifted the direction of any deviation may also be ascertained.

This device also may be rendered insensitive to spatial variations in the intensity of the radiation used by placing a birefringent element in front of the grating and a polarization-separating element behind the grating, and by including a radiation-sensitive detection system in each of the radiation paths of the sub-beams polarized at right angles to one another. The sub-beams may be distinguished by color instead of by direction of polarization in that the component gratings are made color selective and a colour selective element is provided behind the grating.

As an alternative, according to the invention the grating may be composed of a matrix of component gratings, the grating stripes of two adjacent component gratings being mutually shifted.

Figure 6:
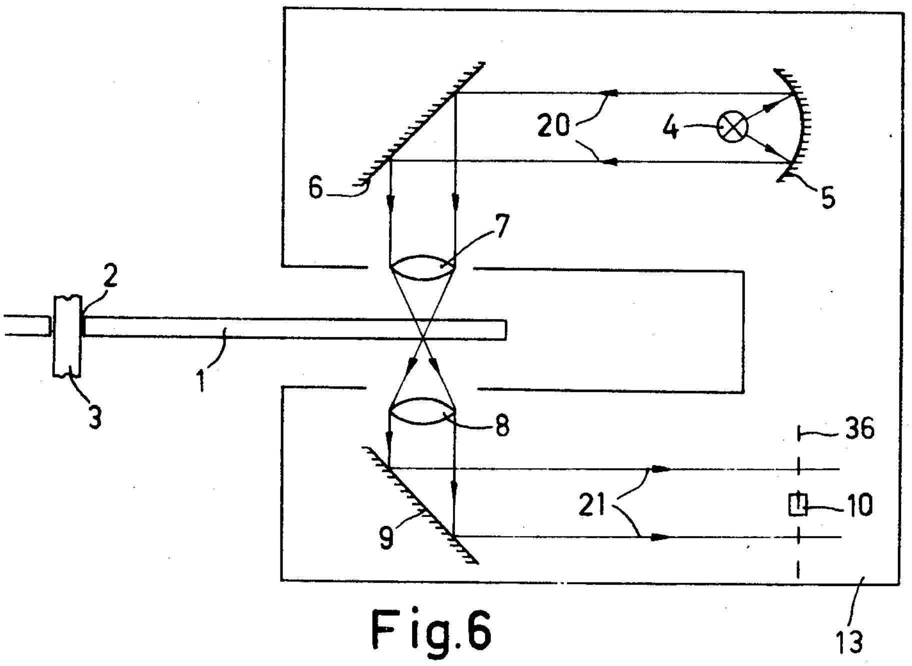
Figure 9:
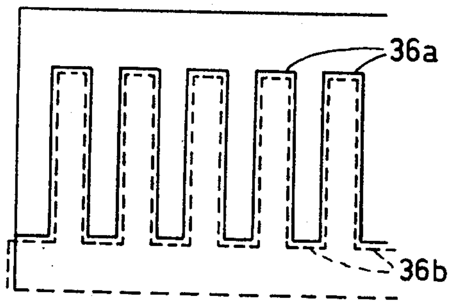
Figure 10:
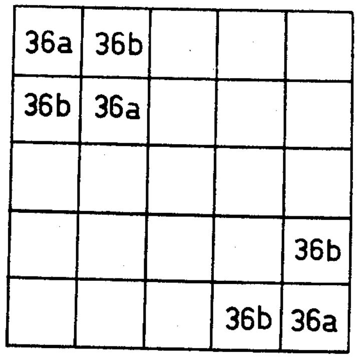
Figure 11:
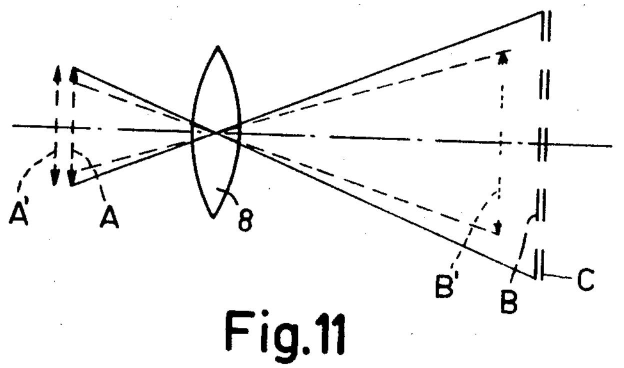

Embodiments of the invention will now be described, by way of example, with reference to the accompanying diagrammatic drawings, in which:

FIGS. 1 and 11 and FIG. 6 respectively show a read apparatus provided with means for detecting displacements of the optical imaging system relative to the information track in the axial and radial directions respectively according to the invention, FIGS. 3 and 4 and FIGS. 7*a*, 7*b*, 9, 8, 10 and 12*a–b* respectively show gratings for use in the apparatus shown in FIG. 1 and FIG. 6 respectively.

Figure 2:
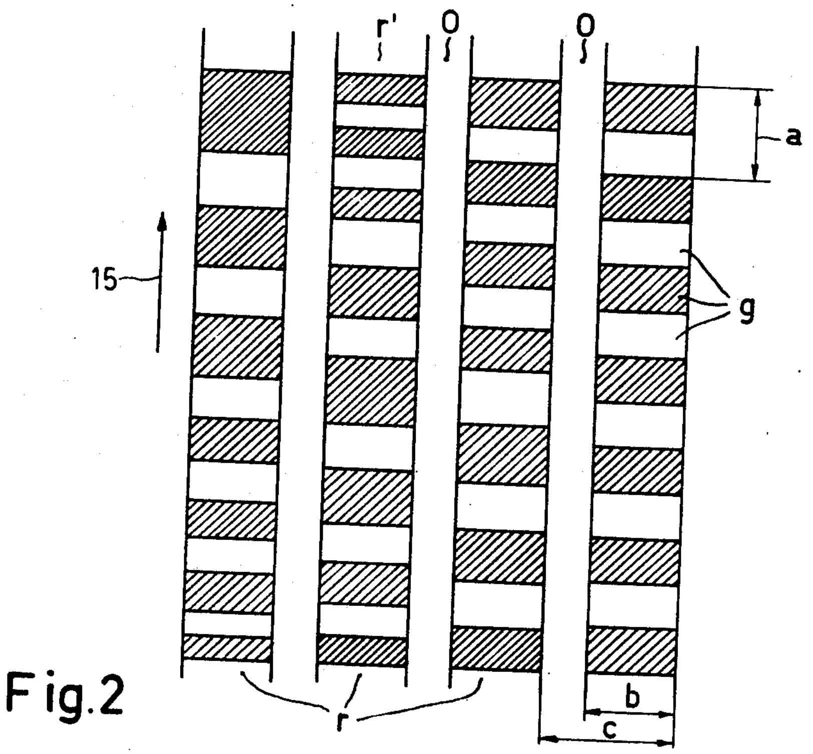

FIGS. 5*a –c* and FIGS. 8*a–b* show how the apparatus shown in FIG. 1 and FIG. 6 respectively may be rendered independent of spatial variations in the intensity of the beam of radiation, and FIG. 2 shows part of an information track.

In the Figures corresponding elements are designated by like reference numerals.

In FIG. 1 reference numeral 1 denotes an information carrier provided with an information track. FIG. 2 is a plan view of a small part of an information track. An arrow 15 indicates the direction in which the information carrier is moved. The information track is composed of a plurality of quasi-concentric stripes *r* comprising areas *g* in which the information is stored. The stripes *r* are separated by neutral stripes *o*. The mean spacing *a* in the transverse direction is approximately 4 μm. The width *b* of the areas also may be approximately 4 μm. The spacing *c* in the radial direction is approximately 6 μm.

The information track may also be composed of concentric stripes. The information track may show a phase structure or an amplitude structure, that is to say it may change the phase or the amplitude of the radiation passing through it. It is possible to let transmit the beam through the information plate or to reflect the beam by the plate. For the sake of simplicity the invention is described only with reference to an information carrier with alternate radiation transmitting and radiation-absorbing areas. The embodiments to be described, however, may also be used for reflexion-structures and phase-structures.

In the apparatus shown in FIG. 1 the information carrier is rotated by means of a spindle 3 which is driven by a motor, not shown, and which passes through a central opening 2 in the information carrier. Radiation emitted by a source 4 is concentrated into a beam by a mirror 5. The beam 20 is reflected by a plane mirror 6 towards the information carrier 1. A lens 7 is arranged between the mirror 6 and the information carrier and focusses the radiation onto the part of the information track to be read. A beam of radiation 21 transmitted by the information carrier is reflected by a plane mirror 9 towards a signal detector cell 10. The entire read system may be accommodated in an enclosure 13 which may be moved in the directions indicated by arrows 14, enabling the information carrier to be radially scanned.

Owing to, for example, errors in the supporting system of the information carrier or the enclosure 13 or to warping of the indication carrier the information track may perform, in addition to a horizontal movement, a vertical movement. To enable the latter movement to be detected the apparatus according to the invention is provided with two gratings 11 and 12 made of alternating radiation-transmitting and radiation-absorbing stripes. As viewed from mirror 9 grid 11 is in front and to the right of detection cell 10, while grid 12 is to left and rearward of detection cell 10. The beam which emerges from the lens 7 illuminates a region on the information carrier the dimensions of which are much greater than the width of a stripe r of the information track. For example, the illuminated region may have the form of a circle of diameter 300 μm. Thus, in addition to the stripe of areas which is to be read, for example the stripe *r'* in FIG. 2, about 25 stripes on the left and on the right or *r'* are also illuminated.

The adjacent stripes *r* and *o* of the information track together form a grating which may be considered to be substantially linear in the illuminated region. An objective lens 8 forms a magnified image of this grating. This will be explained with reference to FIG. 3 which is a perspective view of the gratings.

A grating A represents part of the information track and is the object on which the beam is to be focussed. The periods of the gratings 11 and 12 correspond to that of the track grating magnified N times by the lens 8. When the image of the object A coincides with the grating 11, the amount of radiation which emerges from the grating 11 reaches a peak, so that a detector cell (not shown) arranged behind the grating 11 will deliver a high intensity electric signal. A detector cell placed behind the grating 12 delivers a signal which is different from the peak value. When the image of the grating A formed by the lens 8 is shifted towards the grating 12, the signal current of the detector cell placed behind the grating 12 will approach the peak value while that of the detector cell placed behind the grid 11 will depart from the extreme value. If the image of the grating A is midway between the gratings 11 and 12, the signal currents are equal. The difference between the signal currents of detector cells arranged behind the gratings 11 and 12 thus may be used to measure deviations in focussing with respect to a plane 15 midway between the gratings 11 and 12.

With the difference signal produced the objective lens 8 may be controlled to return the image to the plane 15 midway between gratings 11 and 12 in one of the known manners. For example the difference signal can be used for moving lens 8 toward or from the information carrier. Controlling of the objective does not form part of the present invention and will not be described in detail. In the plane 15 is arranged the detector cell 10 capable of detecting the high-frequency luminous variations in the radiation beam which are due to the interaction of this beam with one of the stripes of areas of the information track.

Figure 3:
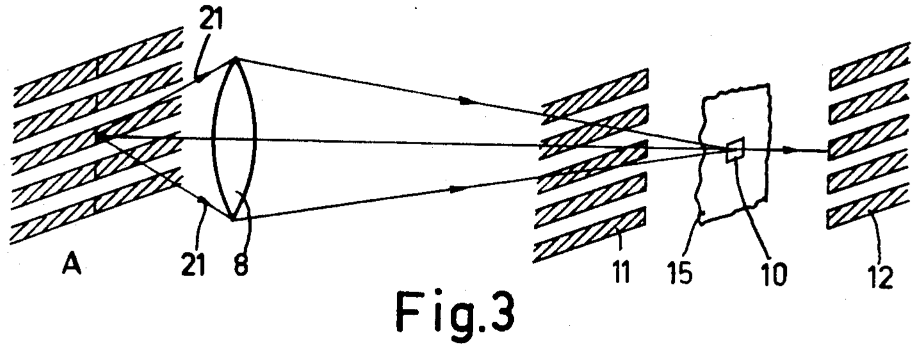

FIGS. 1 and 3 show two gratings comprising radiation-transmitting and radiation-absorbing stripes. The radiation from each of the gratings may be consentrated on separate detection cells (not shown) by means of lens system (also not shown). It is also possible, however, for the detector to be constructed in the form of a grating, i.e., as a configuration of alternate radiation-sensitive and radiation-insensitive stripes. This saves space, and an optical system for producing an image of the grating on the detector cell may be dispensed with. This also applies to any of the gratings to be described hereinafter.

Figure 4:
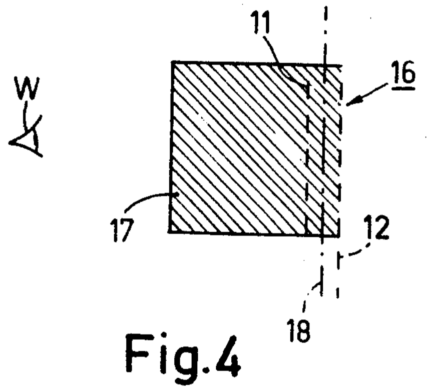

FIG. 3 shows a situation in which the two gratings 11 and 12 are physically spaced from one another. As an alternative, however, the two gratings may take the form of a single grating with a glass plate arranged in front of one of the grating parts, as is shown in FIG. 4. In this Figure reference numeral 16 denotes the actual grating. A glass plate 17 is arranged in front of the upper part of this grating. As a result, an observer W sees this grating part as a grating 11 which is shifted towards the observer with respect to the grating 16. The lower part of the grating 16 is observed as a grating 12 at the same location as the grating 16. A dot dash line 18 indicates the location of the plane in which the signal detector cell is positioned. Obviously, as an alternative glass plates of different thicknesses may be placed before both parts of the grating 16. Also, the plates may be made of another radiation-transmitting material than glass.

Figure 5A:
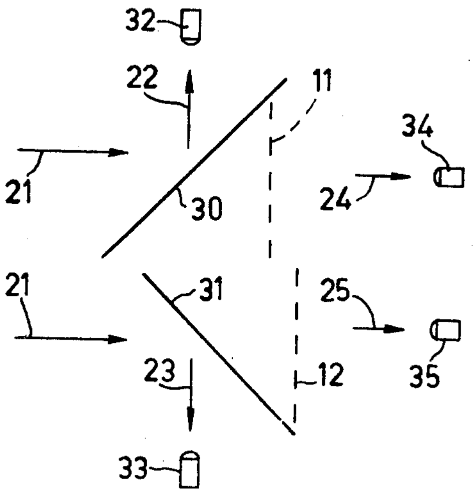

In the grating arrangements described the various grating parts are struck by different parts of the radiation beam. If the intensity of the beam should vary across its cross-sectional area, the beam parts passing through the gratings 11 and 12 would have different intensities, even if the image plane of the information grating should lie midway between the gratings 11 and 12. Erroneous detection owing to spatial intensity variations in the radiation beam can be avoided according to the invention by using an arrangement as shown in FIG. 5*a*.

Two semi-transparent mirrors 30 and 31 are inserted in the path of the radiation beam 21 towards the gratings 11 and 12 respectively. As a result, part of the radiation is directed as a beam 22 and 23 to reference detector cells 32 and 33 respectively. The remainder of the radiation reaches detector cells 34 and 35 as a beam 24 and a beam 25 respectively. The quotients of the electric output signals of the cells 32 and 34 and that of the cells 33 and 35 are electronically determined. The signals, $$S_A = S_{34}/S_{32}$$

and $S_B = S_{35}/S_{33}$
respectively which depend only on the locations of the gratings 11 and 12 relative to the image plane may then be compared with one another.

Figure 5B:
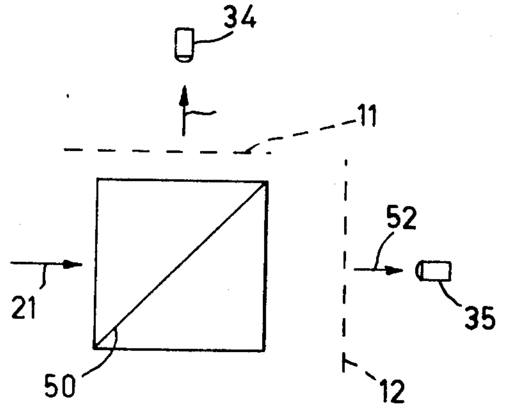
Figure 5C:
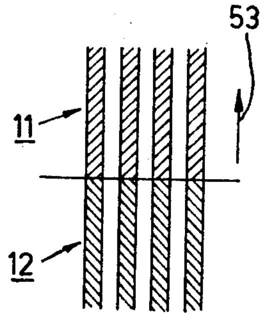

FIG. 5*b* shows a second arrangement according to the invention which is insensitive to spatial variations in the radiation beam. The radiation beam 21 from the information carrier is divided into two sub-beams by a beam-splitting mirror 50. Gratings 11 and 12 are inserted each in the path of one of the sub-beams. The gratings 11 and 12 are spaced by different distances from the beam splitter. Thus, the information grating is imaged on the two component gratings by two beams having the same spatial intensity distribution.

According to the invention the apparatus may also be rendered insensitive to inhomogeneities in the grating image of the information carrier. For this purpose the two component gratings 11 and 12 may be aligned so that the directions of length of the stripes coincide, see FIG. 5*c*. When the information carrier is read its image is moved over the component gratings in the direction indicated by an arrow 53, so that these component gratings are successively struck by radiation beams having the same spatial intensity distribution.

FIG. 6 shows schematically a read apparatus provided with means for detecting the radial position of the read beam relative to the information carrier. This apparatus is similar to that shown in FIG. 1. However, instead of two gratings of radiation-transmitting and radiation-absorbing stripes arranged one on either side of the plane of the signal detector cell a single grating is positioned in this plane. Images of a plurality of stripes of information areas in the vicinity of the stripe of the information carrier to be read are formed on the said grating by the lens 8. When the radiation-absorbing stripes of the grating 36 coincide with the dark stripes of the image of the information grating formed by the lens 8 the amount of radiation incident on a detector cell placed behind the grating 36 is maximum. When the dark stripes of the image grating screen off the radiation-transmitting stipes of the grating 36, the amount of radiation incident on the detector cell is a minimum. By electronically measuring the output signal from the detector cell it may be ascertained whether the read beam is correctly positioned with respect to the information track. The output signal may be used to displace the read beam in a radial direction across the information track.

Figure 7A:
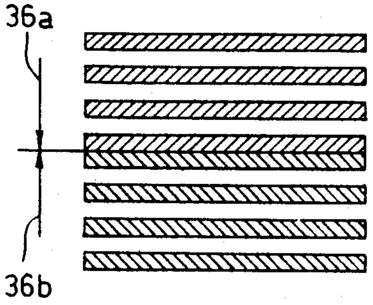
Figure 7B:
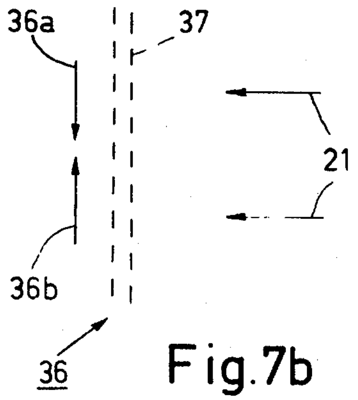

In order to determine the sign also of a positional deviation of the read beam relative to the information carrier, according to the invention the grating may take the form of two component gratings the stripes of which are shifted relative to one another. FIG. 7*a* is a front elevation of part of such a grating. A component grating 36*a* has the same structure as a component grating 36*b* except that the positions of the radiation-transmitting and the radiation-absorbing stripes are interchanged in the two component gratings. When an image 37 of the information grating occupies the position shown in FIG. 7*b* relative to the grating 36, the radiations which emerge from the component gratings 36*a* and 36*b* will have equal intensities. When the image grating 37 is displaced upward, the amount of radiation transmitted by the component grating 36*a* will be reduced and that transmitted by the component grating 36*b* will be increased. The converse will occur when the image grating 37 is shifted downward. By comparing the values of the electric output signals from detector cells arranged behind the grating 36, the direction of any deviation can be found.

Figure 8A:
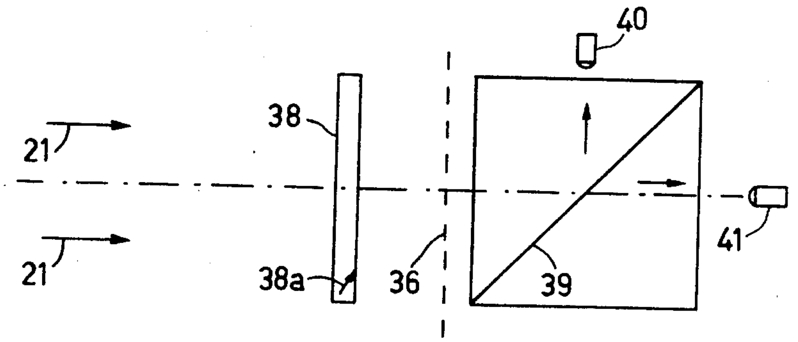

The apparatus shown in FIG. 6 may be made independent of spatial variations in the intensity of the radiation beam in the manner described with reference to FIGS. 5*a* and 5*b*. However, this independence may alternatively be achieved by arranging a birefringent element, such as a quartz plate 38 having an optic axis 38*a* at an angle of 45° to the major surface, in front of the grating 36, as is shown in FIG. 8*a*. The radiation beam 21 incident on the quartz plate 38 is divided by it into two sub-beams which are polarized at right angles to one another and are mutually shifted through a small distance in a direction at right angles to the direction of the incident beam. Thus, there are produced in the plane of the grating 36 two images of the information grating which are mutually shifted by one half of a grating spacing. Behind the grating 36 is arranged an element 39 which in accordance with the direction of polarisation either reflects the radiation towards a detector cell 40 or transmits it towards a detector cell 41. Instead of a quartz plate a Wollaston prism or a Savart plate may be used as the element 38.

Figure 8B:
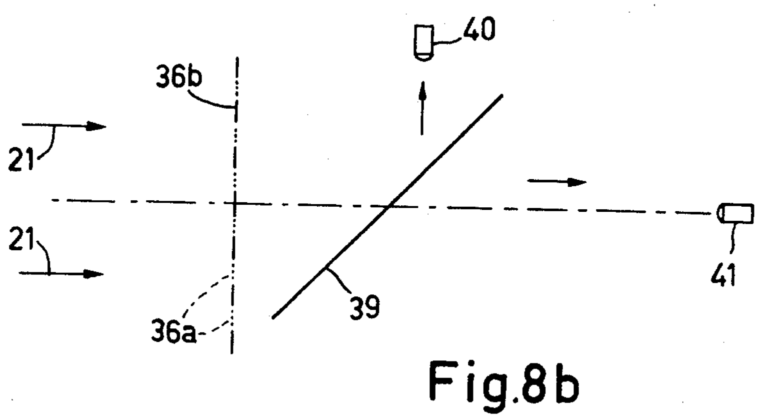

Instead of by directional polarization the sub-beams may also be distinguished by color, for which purpose the component gratings are differently colored, as is shown in FIG. 8*b*. The component grating 36*b* shown in full lines transmits, for example, red light only, while the component grating 36*a* shown in broken lines transmits blue light only. The component gratings may be interlaced, i.e., the radiation-transmitting stripes of the grating 36*b* may be situated at the locations of the initial radiation-absorbing stripes of the grating 36*a*, and vice versa. A color separating element, such as a color-selective mirror 39, is arranged behind the grating 36 and reflects a beam of one color to a detector cell 40 and transmits a beam of the other color to a detector cell 41.

If grating-shaped radiation detectors are used, they may have a comb-shaped configuration. In this event they may be interdigitated, as is shown in FIG. 9. The radiation-sensitive stripes of the component grating 36*a* are situated between the radiation-sensitive stripes of the component grating 36*b* and vice versa. Thus the two component gratings are illuminated by the same radiation beams. The arrangement illustrated by FIGS. 8*b* and 9 further has the great advantage that the effective radiation-sensitive surface area is about twice that obtained when the component gratings are placed side by side. Hence, with the same amount of light a signal of about double magnitude is obtainable at the outputs of the detectors. According to the invention, a grating 36 may also be divided into a large number of component gratings 36*a* and 36*b*, the grating stripes of horizontally and vertically adjacent component gratings being shifted. FIG. 10 is a front elevation of such a grating structure. The component gratings 36*a* and 36*b* are distributed over the entire cross-sectional area of the beam of radiation, so that spatial variations in radiation intensity are averaged out.

According to the invention it is also possible to use a grating placed in the plane of the signal detector cell for detecting displacements of the plane in which the part of the information carrier to be read is imaged. For this purpose the magnification of the lens 8 is utilized. This will be explained more fully with reference to FIG. 11.

A magnified image of an information grating A is produced by a lens 8. If the grating A is correctly positioned, the image B of this grating is formed in the plane of a grating C situated in the plane of the signal detector cell. Behind the grating C there are arranged at least three detector cells one of which intercepts the radiation from the center part of the grating C, while the other two intercept the radiation from the edges of the grating C. The grating spacings of B and C are equal and the radiation-absorbing and radiation-transmitting stripes of both gratings are oriented in a manner such that the detector cells placed behind the grating C deliver a given signal. If the information grating is shifted to the left (A'), the grating spacing of the image B' corresponding to the shifted information grating A' will be smaller than that of C, and in addition B' is spaced from C. When the information grating is shifted to the right a converse situation is obtained. Thus, the amount of radiation incident on the detector cells arranged behind the grating C depends upon the distance between the lens 8 and the information grating.

Such a grating for detecting displacements of the image plane may be combined with a grating for detecting radial displacements of the read beam relative to the information carrier.

Figure 12A:
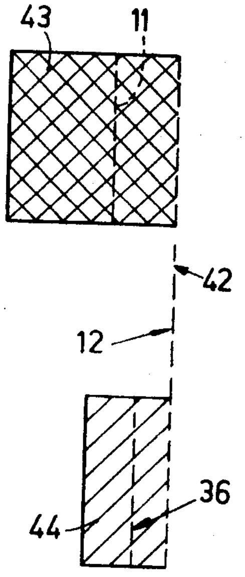
Figure 12B:
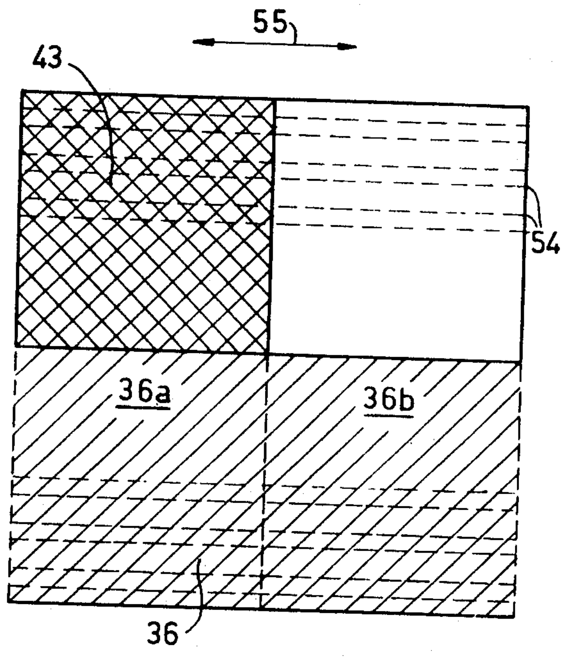

The component gratings for detecting changes in the position of the image plane, the optical path lengths between each of these component gratings and the information carrier being different, may also be combined with a grating for detecting radial displacements of the information carrier relative to the optical imaging system, as is shown in FIG. 12*a*. The assembly comprises a grating 42 two parts of which are covered by glass plates 43 and 44 of different thicknesses, while a third part remains uncovered. An observer then will see the grating part behind the plate 43 as a grating 11 and the grating part behind the plate 44 as a grating 36. The uncovered part of the grating 42 is observed as a grating 12. The grating 36, which serves to detect deviations in a radial direction, lies midway between the gratings 11 and 12 which serve to detect vertical deviations. The grating 36 may take the form of two component gratings 36*a* and 36*b* with mutually phase-shifted grating stripes. This grating 36 may occupy one half of the surface area of the grating 42. For this purpose this half is covered by a thin glass plate (see FIG. 12*b*). One half of the remainder of the grating is covered by a thick glass plate 43 and the other half remains uncovered. Broken lines 54 indicate how an image of the information grating is formed on the grating 42. An arrow 55 indicates how the image grating 54 moves over the grating 42 when the information carrier is read.

What is claimed is:

1. Apparatus for reading, by means of a beam of radiation, a disk-shaped information carrier which contains spirally arranged information signals coded in optical form, which apparatus comprises a source of radiation, a radiation-sensitive signal detector cell, the information carrier being disposed in the radiation path between this source and this detector cell, at least two periodic gratings which consist of radiation-transmitting and radiation-absorbing stripes, each of the gratings being at a different optical distance from the information carrier, optical means in the path of the radiation eminating from the carrier for imaging on the gratings a part of the grating-shaped structure of the carrier information track in the vicinity of the portion of this track to be read, and a radiation-sensitive detection means in the path of the radiation eminating from the gratings for providing a focus control signal for said optical means.

2. Apparatus as claimed in claim 1, characterized in that a grating and the radiation-sensitive detection system are combined to form a grating-shaped radiation-sensitive detector.

3. Apparatus as claimed in claim 1, characterized in that the two gratings each consist of radiation-transmitting and radiation-absorbing stripes in the path of the radiation eminating from the information carrier, the optical path length between either grating and the location of the information carrier being different.

4. Apparatus as claimed in claim 3, further comprising radiation-transmitting plates of different thicknesses arranged in front of one of the gratings, thereby forming grating images having different effective path lengths to the carrier, wherein at least one of the two gratings is a virtual grating formed by interaction between the periodic grating and the radiation transmitting plates.

5. Apparatus as claimed in claim 3 further comprising a beam splitter arranged in front of either grating, and wherein said radiation-sensitive detection means is inserted in each of the radiation paths of the sub-beams produced by the beam splitters.

6. Apparatus as claimed in claim 3, further comprising a beam splitter inserted in the radiation path of the beam from the information carrier, wherein each of the gratings is included in the path of each of the sub-beams produced by the beam splitter, the gratings being spaced by different distances from the beam splitter.

7. Apparatus as claimed in claim 3, characterized in that the stripes of the gratings projected on to an imaginary plane perpendicular to the impinging radiation are aligned.

8. Apparatus as claimed in claim 7, characterized in that the grating comprises a matrix of component gratings, the grating stripes of two adjacent component gratings being shifted in phase.

9. Apparatus as claimed in claim 1, further comprising an additional grating consisting of radiation-transmitting and radiation-absorbing stripes arranged in the plane of the signal detector cell.

10. Apparatus as claimed in claim 9, further comprising a birefringent element in the radiation path in front of the grating, a polarization separating element in the radiation path behind the grating, and an additional radiation-sensitive detection inserted in the path of each of the sub-beams produced by the polarization-separating element.

11. Apparatus as claimed in claim 9, characterized in that the additional grating comprises two component gratings the grating stripes of which are mutually shifted in phase.

12. Apparatus as claimed in claim 11, further comprising a beam splitter in the path of the beam of radiation which emerges from the information carrier, and wherein each component grating is inserted in the path of each of the sub-beams produced by the beam splitter.

13. Apparatus as claimed in claim 11, wherein the radiation-transmitting stripes of one of the component gratings projected on an imaginary plane perpendicular to the impinging radiation are aligned with the radiation-absorbing stripes of a similar projection of the other component grating.

14. Apparatus as claimed in claim 11, characterized in that the component gratings are color-selective, the radiation-transmitting stripes of one of the components gratings being interlaced with the radiation-transmitting stripes of the other component grating.

15. Apparatus as claimed in claim 11, wherein each component grating and the signal detector cell are combined to form a grating shaped radiation-sensitive detector, characterized in that the radiation-sensitive stripes of each component grating are interlaced with the radiation-sensitive stripes of the other component grating.

* * * * *

PO-1050
(5/69)

UNITED STATES PATENT OFFICE
CERTIFICATE OF CORRECTION

Patent No. 3,833,769 Dated Sept. 3, 1974

Inventor(s) KLAAS COMPAAN AND GIJSBERTUS BOUWHUIS

It is certified that error appears in the above-identified patent and that said Letters Patent are hereby corrected as shown below:

In the Abstract, line 5, "radiationsensitive" should be

--radiation-sensitive--;

Col. 2, line 67, "colour" should be --color--;

IN THE CLAIMS

Claim 10, line 5, after "detection" insert --means--;

Signed and sealed this 3rd day of December 1974.

(SEAL)
Attest:

McCOY M. GIBSON JR.
Attesting Officer

C. MARSHALL DANN
Commissioner of Patents